(12) United States Patent
Kalapatapu et al.

(10) Patent No.: US 9,998,987 B2
(45) Date of Patent: Jun. 12, 2018

(54) PROXIMITY OFFLOADING AND SERVICE CONTINUITY SUPPORT FOR MOBILE COMMUNICATION DEVICES

(71) Applicant: Avago Technologies General IP (Singapore) Pte. Ltd.

(72) Inventors: Dutt H. Kalapatapu, Santa Clara, CA (US); Farouk Belghoul, Campbell, CA (US); Kamesh Medapalli, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days. days.

(21) Appl. No.: 14/150,440

(22) Filed: Jan. 8, 2014

(65) Prior Publication Data

US 2014/0192667 A1    Jul. 10, 2014

Related U.S. Application Data

(60) Provisional application No. 61/750,288, filed on Jan. 8, 2013.

(51) Int. Cl.
*H04W 52/02* (2009.01)
*H04W 64/00* (2009.01)
*H04W 4/02* (2018.01)
*H04W 80/04* (2009.01)

(52) U.S. Cl.
CPC ....... *H04W 52/0209* (2013.01); *H04W 76/14* (2018.02); *H04W 4/023* (2013.01); *H04W 64/00* (2013.01); *H04W 80/04* (2013.01); *Y02D 70/00* (2018.01); *Y02D 70/1262* (2018.01); *Y02D 70/142* (2018.01); *Y02D 70/144* (2018.01); *Y02D 70/164* (2018.01); *Y02D 70/22* (2018.01)

(58) Field of Classification Search
USPC ........................................................ 370/252
See application file for complete search history.

(56) References Cited

U.S. PATENT DOCUMENTS

| | | | | |
|---|---|---|---|---|
| 2006/0062176 A1* | 3/2006 | Ikemura | ................ | H04W 80/04 370/328 |
| 2009/0022124 A1* | 1/2009 | Faccin | .......................... | 370/338 |
| 2013/0316727 A1* | 11/2013 | Edge | ........................... | 455/456.1 |

* cited by examiner

*Primary Examiner* — Gregory Sefcheck
*Assistant Examiner* — Majid Esmaeilian
(74) *Attorney, Agent, or Firm* — Sterne, Kessler, Goldstein & Fox P.L.L.C.

(57) ABSTRACT

Systems and methods are provided to facilitate direct wireless communication between mobile communication devices while avoiding the need for mobile communication devices to periodically scan for in-range devices and avoiding unwanted breaks in traffic caused by changes in the source and/or destination IP address of packets. Mobile communication devices periodically update their positions to a server, which can send a notification when a mobile communication device comes within range. Further, mobile communication devices can encapsulate packets with an IP address used for direct wireless communication to facilitate this direct wireless communication without disrupting traffic over a core network.

14 Claims, 8 Drawing Sheets

PROXIMITY OFFLOADING AND SERVICE CONTINUITY SUPPORT FOR MOBILE COMMUNICATION DEVICES

CROSS REFERENCE TO RELATED APPLICATIONS

This application claims the benefit of U.S. Provisional Patent Application No. 61/750,288, filed on Jan. 8, 2013, which is incorporated by reference herein in its entirety.

FIELD OF THE DISCLOSURE

This disclosure relates to mobile communications, including power saving for mobile communication devices.

BACKGROUND

Mobile communication devices, such as cellular telephones, can communicate with each other through infrastructure provided by a service provider or directly using a wireless peer-to-peer (P2P) standard. Direct P2P communication between mobile communication devices uses less battery power than communication between the same devices through service provider infrastructure. Thus, using direct P2P communication can be advantageous when possible to increase battery life. However, direct P2P communication between mobile communication devices can be difficult to facilitate.

For example, to support direct P2P communication, mobile communication devices need to be within a certain geographical range of each other, and users typically have to be aware that both the sending and receiving mobile communication device are within this geographical range. Thus, to support P2P functionality, mobile communication devices typically have to periodically scan for other mobile communication devices in range. This scanning requires extra processing and battery power.

Further, it can be challenging to support direct P2P applications and applications using the service provider infrastructure at the same time on a single mobile communication device without negatively impacting network traffic. For example, if a mobile communication device switches the traffic from the core service provider network to a direct path to another mobile communication device, this switch can require a change in the source and/or destination addresses, which can cause a break in the traffic.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1A:
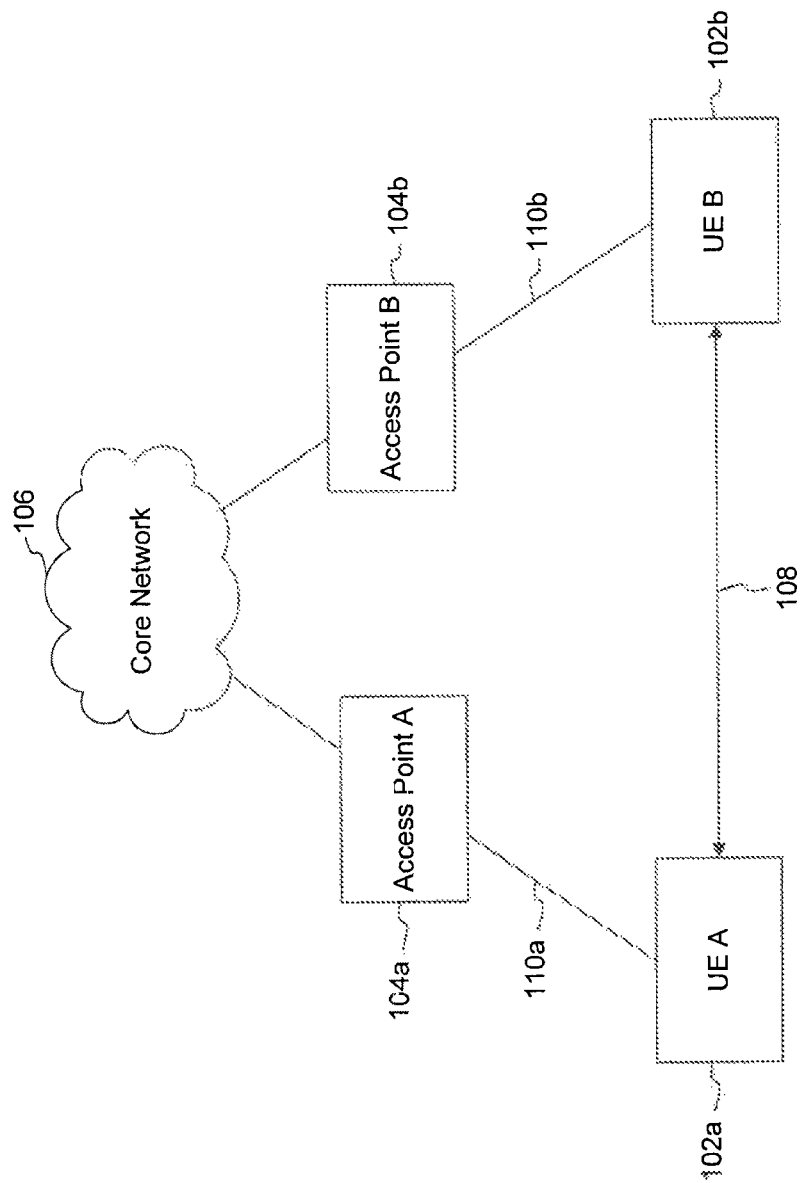
FIG. 1A is a diagram illustrating direct and indirect communication between mobile communication devices.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," and "an example embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

Embodiments of the present disclosure provide systems and methods to facilitate direct wireless communication between mobile communication devices. Systems and methods according to embodiments of the present disclosure support IP encapsulation techniques that enable mobile communication devices to switch between direct communication with each other and indirect communication over a network while avoiding unwanted breaks in traffic caused by changes in the source and/or destination Internet Protocol (IP) address of packets.

Embodiments of the present disclosure also provide systems and methods for sending notifications to a mobile communication device to enable the mobile communication device to determine whether another mobile communication device is geographically close enough to support direct communication. These notifications enable mobile communication devices to avoid the need to periodically scan for in-range devices.

2. Direct and Indirect Communication

FIG. 1A is a diagram illustrating direct and indirect communication between mobile communication devices. FIG. 1A shows two mobile communication devices, labeled user equipment (UE) A 102a and UE B 102b. FIG. 1A also shows a core network 106 and two access points—access point A 104a and access point B 104b. In an embodiment, UE A 102a and UE B 102b can communicate with each other directly 108, without an intervening network device. UE A 102a and UE B 102b can also communicate with each other indirectly 110 by communicating through access points 104 of core network 106.

In an embodiment, core network 106 is a network provided by a service provider. For example, core network 106 can be a wireless communication network operating according to a standard, such as 3G or 4G long term evolution (LTE). Core network 106 can also be any other kind of communication network including, but not limited to, a GSM (Global System for Mobile Communications) network and a Wi-Fi network, among others.

Access points 104 can be base stations or wireless access points for core network 106. In an embodiment, access points 104 are implemented as E-UTRAN Node B (eNodeB) elements of an LTE system. In an embodiment, core network 106 and/or access points 104 are used to implement an architecture in accordance with System Architecture Evolution (SAE) of the 3rd Generation Partnership Project (3GPP) LTE wireless communication standard. In an embodiment, this architecture includes one or more Evolved Packet Cores (EPCs) associated with access points 104.

For example, if UE A 102a is within the service area of access point 104a, UE A 102a can send a message through access point A 104a. Access point A 104a can send a message through the service provider infrastructure of core network 106 and can relay this message to access point B 104b that services a geographical area containing UE B 102b. Thus, UEs 102 can communicate with each other indirectly 110 through core network 106 even if UEs 102 are geographically located a large distance from each other. This indirect communication 110 requires more battery power than direct communication 108, so when possible, direct communication 108 can be advantageous to conserve battery power. Additionally, in an embodiment, direct communication 108 can support a higher data rate than indirect communication 110.

In an embodiment, UEs 102 can communicate using a peer-to-peer (P2P) wireless direct communication technique, such as, but not limited by, Wi-Fi Direct and Bluetooth.

Direct communication 108 also has disadvantages, however. For example, in an embodiment, UE A 102a has to be within a certain predefined range of UE B 102b to directly communicate 108 with UE B 102b. Further, in an embodiment, UE A 102a has to periodically scan for the location and/or presence of UE B 102b to determine that UE B 102b is close enough for direct communication 108. This additional scanning can disadvantageously require UE A 102a to expend additional battery power. Further, direct communication 108 can disadvantageously require UE A 102a to change the source and/or destination IP address of packets, which can cause a break in the traffic. Embodiments of the present disclosure facilitate direct communication 108 between UEs 102 while avoiding the need for UEs 102 to periodically scan for in-range UEs and avoiding unwanted breaks in traffic caused by changes in the source and/or destination IP address of packets.

3. IP Address Encapsulation

Figure 1B:
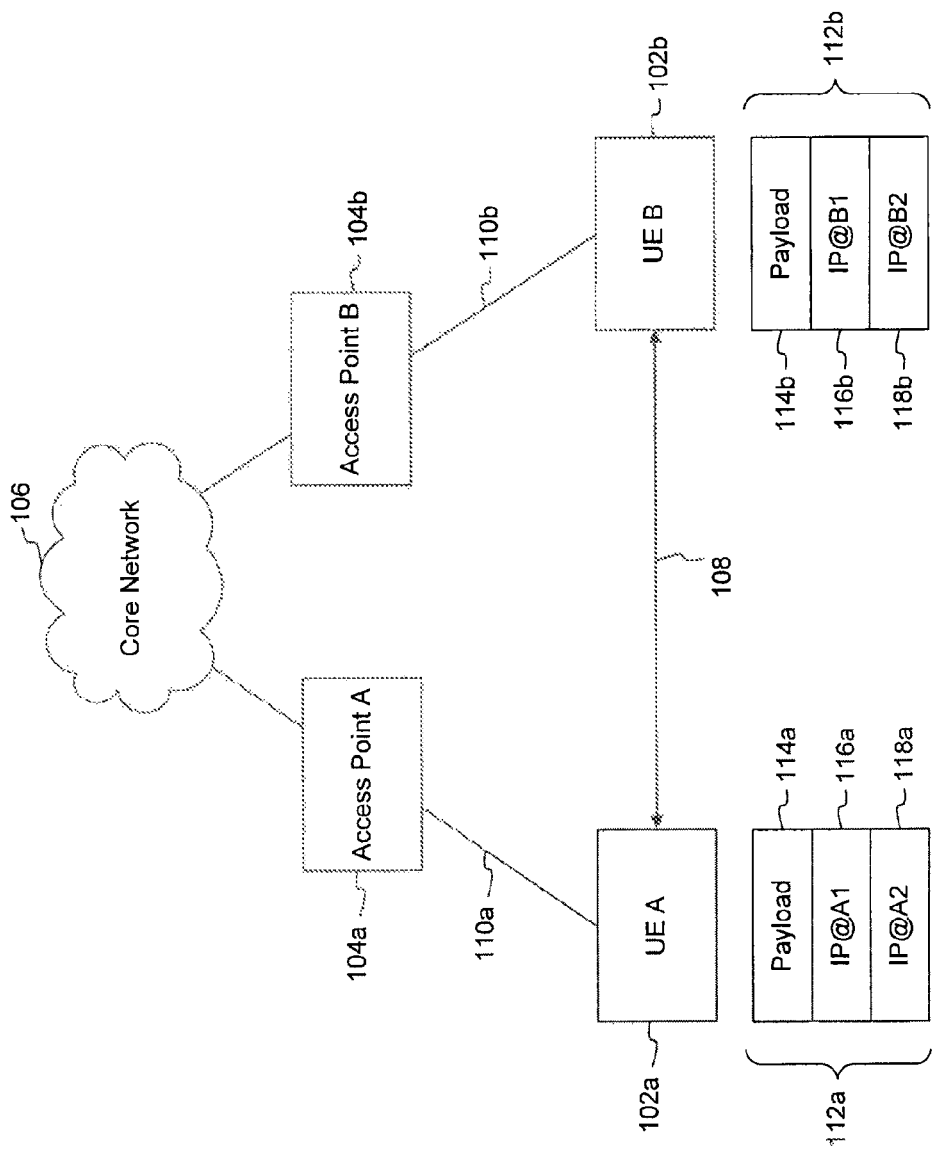
FIG. 1B is a diagram illustrating packets sent by mobile communication devices and IP addresses associated with these packets.

FIG. 1B is a diagram illustrating packets 112 sent by mobile communication devices and IP addresses 116 and 118 that can be associated with these packets. In FIG. 1B, each packet 112 has a payload 114. When UE A 102a is communicating over core network 106, payload 114a can be sent from a certain IP address 116a. For example, If UE A 102a is indirectly communicating 110 with UE B 102b over core network 106, UE A 102a can send payload 114a to UE B 102b from IP address 116a of UE A 102a to IP address 116b of UE B 102b. Likewise, UE B 102b can send payload 114b from IP address 116b to IP address 116a.

IP addresses, such as IP addresses 116, can be used to identify a device and a location of a device within a network. For example, IP address 116a contains information identifying device UE A 102a and location of UE A 102a within core network 106. Likewise, IP address 116b contains information identifying device UE B 102b and location of UE A 102b within core network 106. When UEs 102 communicate directly 108, new IP addresses 118 can be used because, for example, UE A 102a and UE B 102b are no longer communicating over core network 106. However, changing the IP address of UEs 102 from IP addresses 116 to IP addresses 118 can interfere with communication over core network 106. For example, when UE A 102a is directly communicating 108 with UE B 102b using a first application, UE A 102a may also be communicating over core network 106 using a second application. Changing the IP address of UE A 102a from IP address 116a to IP address 118a could disrupt communication of the second application.

In an embodiment of the present disclosure, UEs 102 use IP encapsulation to facilitate direct communication 108 without disrupting indirect communication 110 over core network 106. For example, if UE A 102a initiates direct communication 108 with UE B 102b, UE A 102a can receive or generate a packet that contains IP address 116a, and UE A 102a can encapsulate this packet with IP address 118a. UE A 102a can send this encapsulated packet to UE B 102b, at IP address 118b, using direct communication 108. Because IP addresses 118 identify the devices and locations of UEs 102 in the direct communication path 108, IP addresses 118 facilitate direct communication 108. However, because encapsulated packets sent via direct communication 108 also contain IP addresses 114, these packets can be routed through core network 106 without disrupting traffic.

For example, when UE B 102b receives an encapsulated packet from UE A 102a, UE B 102b can decapsulate this packet (e.g., by removing IP address 118a and/or IP address 118b from the packet) and can send it over core network 106 (e.g., to a third device) using IP address 116b and/or 116a.

Because the packet from UE A 102*a* contained IP address 116*a*, the path this packet was transmitted along (e.g., from UE A 102*a* to UE B 102*b* and over core network 106) is not lost when the encapsulated packet is sent over direct communication link 108. Thus, using encapsulation techniques, systems and methods according to embodiments of the present disclosure can provide service continuity support to facilitate direct communication 108 without disrupting traffic over core network 106. Additionally, embodiments of the present disclosure advantageously facilitate this direct communication in a way that is transparent to a user.

4. Proximity Offloading

As discussed above, continually scanning for in-range mobile communication devices for direct communication 108 can disadvantageously require additional battery power to be expended by UEs 102. To avoid expending this additional battery power, systems and methods according to embodiments of the present disclosure can use proximity offloading techniques so that UEs 102 can receive location information of in-range mobile communication devices from a server. For example, in an embodiment, UEs 102 periodically update their location to one or more servers in communication with core network 106, and this server can notify UEs 102 when a mobile communication device comes within range of direct communication 108.

Figure 2:
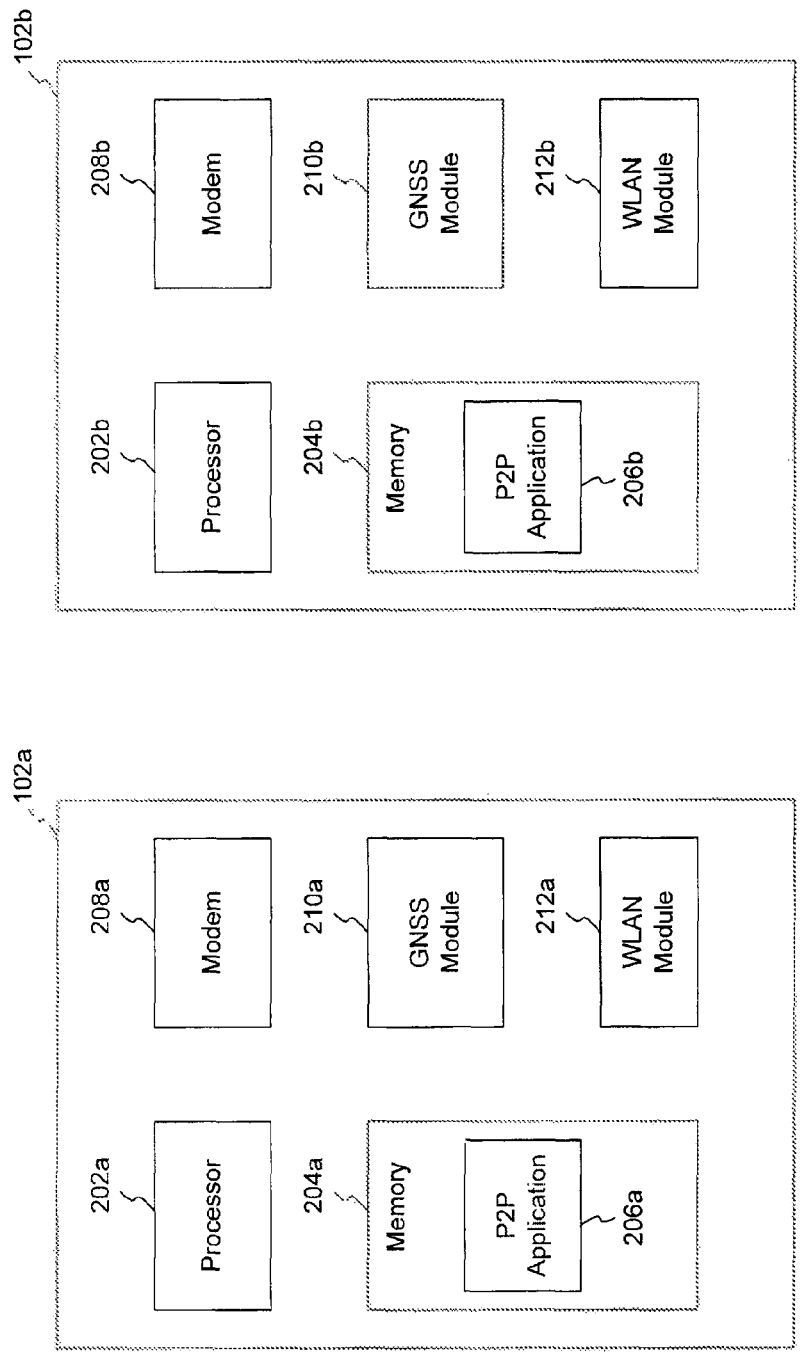
FIG. 2 is a block diagram of components of mobile communication devices in accordance with an embodiment of the present disclosure.

FIG. 2 is a block diagram of components of mobile communication devices in accordance with an embodiment of the present disclosure. In FIG. 2, UEs 102 include processors 202, modems 208, wireless local area network (WLAN) modules 212, Global Navigation Satellite System (GNSS) modules 210, and memories 204. In an embodiment, memories 204 can include one or more P2P applications 206 that can be used over direct communication 108. In an embodiment, each WLAN module 212 includes a respective transmitter and receiver that can be used to facilitate this direct communication. In an embodiment, each GNSS module 210 includes a respective satellite receiver that can be used to determine the geographical location of UEs 102 using satellite positioning. Using GNSS modules 210, UEs 102 can periodically send updates containing information about their geographic locations to one or more servers in communication with core network 106.

Figure 3:
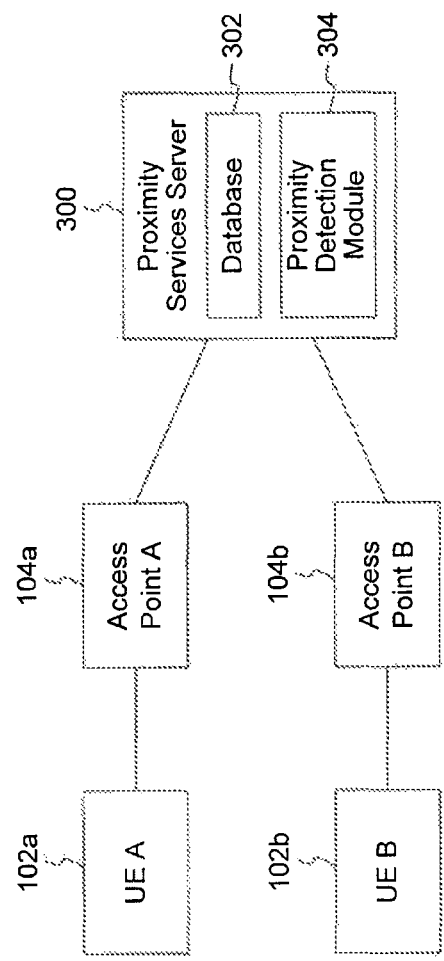
FIG. 3 is a block diagram showing a proximity services server in communication with access points of a core network in accordance with an embodiment of the present disclosure.

FIG. 3 is a block diagram showing a proximity services server in communication with access points of a core network in accordance with an embodiment of the present disclosure. In FIG. 3, proximity services server 300 includes a database 302 and a proximity detection module 304. In an embodiment, UEs 102 can send information regarding their geographic locations to proximity services server 300 via access points 104, and proximity detection module 304 can send proximity updates to UEs 102 using this geographic location information.

Proximity services server 300 and/or proximity detection module 304 can be implemented on a device within core network 106 or on a device on a third party network in communication with core network 106. In an embodiment, proximity services server 300 is an application server in an IMS (IP Multimedia Core Network Subsystem) layer of a 3GPP network.

Proximity services server 300 and/or proximity detection module 304 can be implemented using hardware, software, or a combination of hardware and software. Core network 106 can use a single proximity services server 300 with a single proximity detection module 304 or multiple proximity services servers, each with one or more proximity detection modules to facilitate proximity offloading in accordance with an embodiment of the present disclosure. For example, in an embodiment, a proximity services server 300 resides in the home public land mobile network (PLMN) of each mobile communication device.

In an embodiment, GNSS modules 210 of UEs 102*a* periodically send updates containing information regarding their geographic location to proximity services server 300 via access points 104. In an embodiment, UEs 102 can provide an option to a user to choose whether or not to periodically send these updates. Further, in an embodiment, UEs 102 can enable a user to choose how often these updates should be sent to proximity services server 300.

Additionally, in an embodiment, UEs 102 can be configured to detect a change in geographic location (e.g., using GNSS modules 210) and to send an update regarding their geographic location in response to detecting this change in geographic location. For example, in an embodiment, UE A 102*a* can be configured to determine whether it has moved a predefined distance from the geographic location that was sent to proximity services server 300 in the last update. In an embodiment, this predefined distance can be configurable (e.g., by a user of UE A 102*a* or a service provider of core network 106).

4.1 Notifications

In an embodiment, proximity services server 300 receives these geographic location updates and can optionally store them (e.g., in database 302 or in another memory). In an embodiment, proximity detection module 304 monitors (e.g., using code executing on proximity services server 300) these geographic location updates. When proximity services server determines that two or more mobile communication devices are geographically close enough to each other to support direct communication 108, proximity detection module 304 can notify one or more of these devices that an option for direct communication is available (e.g., by sending an alert). Notifications in accordance with embodiments of the present disclosure include, but are not limited to, pop up boxes, text messages, email notifications, and instant message notifications, among others. These notifications can be enabled or disabled by a user of a mobile communication device.

Further, in an embodiment, these notifications can be used to update software stored on a mobile communication device that can enable a user to check whether direct communication is available. For example, in an embodiment, proximity services server 300 can send a notification to software executing on UE A 102*a* (e.g., P2P application 206*a* or another application), and this software can update the status of mobile communication devices that are geographically close enough to UE A 102*a* to support direct communication 108. For example, a user of UE A 102*a* can periodically check this software to determine, based on these updates, if UE B 102*b* or any other device is geographically close enough to UE A 102*a* to support direct communication 108. This software can also optionally provide the user with the option to initiate direct communication with an in-range mobile communication device.

An example of a system implementing proximity notifications in accordance with an embodiment of the present disclosure will now be discussed with reference to FIGS. 1-3. In an embodiment, UE A 102*a* and UE B 102*b* can periodically send updates to proximity services server 300 regarding their respective geographic locations using GNSS modules 210. Proximity services server can store these updates in database 302. When proximity services server 300 receives one of these updates, proximity detection module 304 can determine, based on this information, if UEs 102 are geographically close enough to support direct communication 108. If proximity detection module 304 determines that UEs 102 are geographically close enough to support direct communication, proximity detection module 304 can send a message to UE A 102*a* and/or UE B 102*b* informing UE A 102*a* and/or UE B 102*b* that they are geographically close enough to each other to support direct communication 108. UE A 102*a* and/or UE B 102*b* can use this information to display an alert to a user or to update software on UE A 102*a* and/or UE B 102*b* regarding the status of in-range mobile communication devices.

Thus, by offloading proximity detection to proximity services server 300, UE A 102*a* and UE B 102*b* can avoid expending battery power on scanning for in-range mobile communication devices. Proximity offloading techniques according to embodiments of the present disclosure can advantageously centralize proximity detection onto one or more servers that receive information from several mobile communication devices, which reduces the overall processing required to determine when the mobile communication devices are geographically close enough for direct communication 108.

4.2 Returning to Indirect Communication

In an embodiment, UEs 102 can terminate direct communication 108 and can initiate indirect communication 110 at any time. For example, a user of UE A 102*a* may determine to terminate direct communication 108 with UE B 102*b* after a call with a user of UE B 102*b* has ended or after UE A 102*a* has finished using P2P application 206*a* with UE B 102*b*.

Additionally, in an embodiment, UEs 102 can initiate indirect communication 110 when performance begins to degrade. For example, in an embodiment, UEs 102 can monitor one or more signal performance metrics (e.g., signal strength, signal quality, noise, and data rate, among others), and when one or more of these signal performance metrics drops below a predetermined threshold, UEs 102 can initiate indirect communication 110. In an embodiment, this predetermined threshold can be configurable (e.g., by a user or a service provider of core network 106).

Further, in an embodiment, UEs 102 can initiate indirect communication 110 when UEs 102 move further apart. For example, UEs 102 can send periodic updates regarding their current geographic location to proximity services server 300, and when proximity detection module 304 determines that UE A 102*a* has moved a predetermined threshold away from UE B 102*b*, proximity detection module 304 can notify UE A 102*a* and/or UE B 102*b*. In an embodiment, this predetermined threshold can be configurable (e.g., by a user or a service provider of core network 106).

UEs 102 can provide the user with an option to return to indirect communication 110 or can initiate indirect communication automatically in accordance with an embodiment of the present disclosure. For example, UEs 102 can display a notification to a user when performance degrades or when UEs 102 move a predetermined threshold away from each other. Alternatively, in an embodiment, UEs 102 can automatically initiate indirect communication 110 when performance degrades or when UEs 102 move a predetermined threshold away from each other. As discussed above, IP address encapsulation techniques in accordance with embodiments of the present disclosure advantageously enable mobile communication devices to initiate indirect communication 110 from direct communication 108 without negatively impacting network traffic.

4.3 Friends List

In an embodiment, proximity services server 300 can send notifications to a mobile communication device whenever any device on a list of eligible devices associated with the mobile communication device moves within direct communication range. For example, in an embodiment, UE A 102*a* can send a list of friends to proximity services server 300, and proximity services server 300 can store this list of friends associated with UE A 102*a* in database 302. This list of friends can be, for example, a contact list stored on UE A 102*a*. Additionally, this list of friends can be associated with a specific device, a specific user, a specific user ID, a group of users or devices, among others.

Proximity services server 300 can notify UE A 102*a* whenever one of the devices on its friends list comes close enough to UE A 102*a* to support direct communication 108 between UE A 102*a* and the device. This enables UE A 102*a* to avoid receiving notifications for devices that UE A 102*a* is unlikely to want to establish direct communication 108 with. For example, UE A 102*a* can add UE B 102*b* to its friends list and can notify proximity services server 300 that UE B 102*b* is a device on its friends list. Proximity services server 300 can store this information in database 302 and can notify UE A 102*a* whenever UE B 102*b* is close enough to UE A 102*a* to support direct communication 108 between UE A 102 and UE B 102*b*.

In an embodiment, proximity services server 300 can require that both UE A 102*a* and UE B 102*b* add each other on their respective friends list before sending notifications to either UE A 102 and UE B 102*b*. In an embodiment, this requirement can be configurable by UEs 102. For example, in an embodiment, a user of UE A 102*a* may want only devices that it has added to the friends list associated with UE A 102*a* to know when it is in range for privacy reasons. Alternatively, a user of UE A 102*a* may not wish to have to add each device to its own friends list to enable other devices to receive notifications regarding the proximity of UE A 102*a* to each device.

In an embodiment, mobile communication devices can request that proximity services server 300 alert them when specific devices designated as friends (and/or a specific user, a specific user ID, a group of users or devices, among others) come close enough to support direct communication 108. For example, in an embodiment, UE A 102*a* can send a request to proximity services server to send a notification to UE A 102*a* when UE B 102*b* comes come close enough to support direct communication 108 between UE A 102*a* and UE B 102*b*. In an embodiment, this notification can be sent to UE A 102*a* in the form of a pop up box, text message, email notification, or instant message notification, among others. Alternatively, this notification can be used to update software stored on UE A 102*a* that can enable a user to check whether direct communication is available.

5. Methods

Figure 4A:
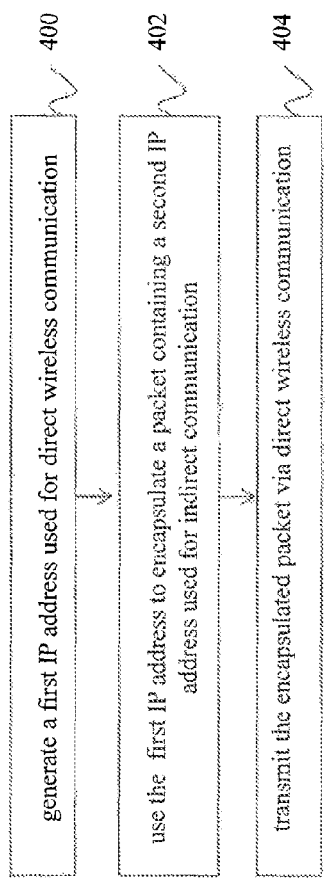
FIG. 4A is a flowchart of a method for encapsulating a packet to facilitate direct wireless communication in accordance with an embodiment of the present disclosure.

FIG. 4A is a flowchart of a method for encapsulating a packet to facilitate direct wireless communication in accordance with an embodiment of the present disclosure. In step 400, a first IP address used for direct wireless communication is generated. For example, UE A 102*a* generates IP address 118*a*. In step 402, the first IP address is used to encapsulate a packet containing a second IP address used for indirect communication. For example, UE A 102*a* forms encapsulated packet 112*a* containing payload 114*a*, IP address 116*a*, and IP address 118*a*. In step 404, the encapsulated packet is transmitted via direct wireless communication. For example, UE A 102*a* transmits encapsulated packet 112*a*. In an embodiment, UE A 102*a* can perform the steps of FIG. 4A using, for example, an application stored in memory 204*a* that is executed using processor 202*a*.

Figure 4B:
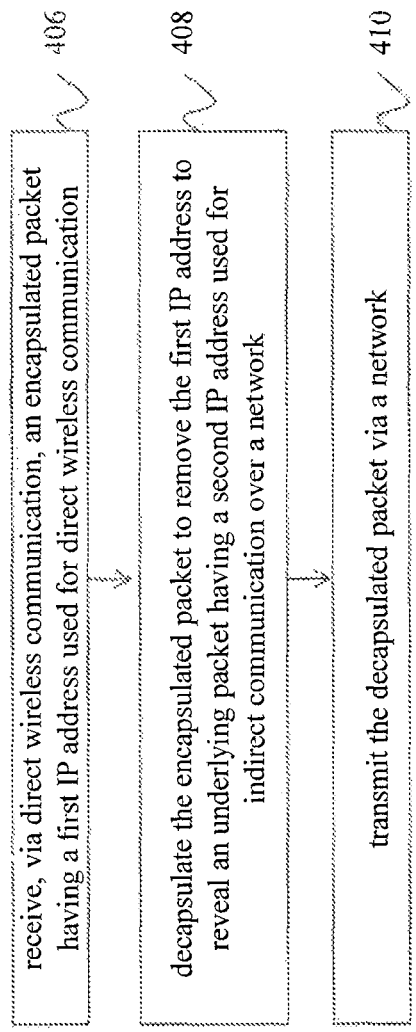
FIG. 4B is a flowchart of a method for decapsulating a packet to facilitate indirect communication in accordance with an embodiment of the present disclosure.

FIG. 4B is a flowchart of a method for decapsulating a packet to facilitate indirect communication in accordance with an embodiment of the present disclosure. In step 406, an encapsulated packet having a first IP address used for direct wireless communication is received via direct wireless communication. For example, UE B 102b receives encapsulated packet 112a having IP address 118a. In step 408, the packet is decapsulated to remove the first IP address to reveal an underlying packet having a second IP address used for indirect communication over a network. For example, UE B 102b removes IP address 118a from the packet. In step 410, the decapsulated packet is transmitted via a network. For example, UE B 112b sends the packet through core network 106 via access point B 104b using IP address 116b associated with core network 106. In an embodiment, UE B 102b can perform the steps of FIG. 4B using, for example, an application stored in memory 204b that is executed using processor 202b.

Figure 5A:
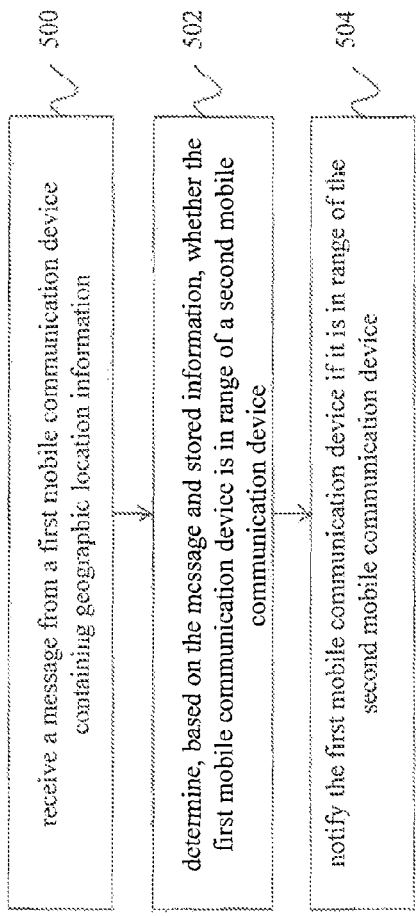
FIG. 5A is a flowchart of a method for notifying a mobile communication device when another mobile communication device comes within range of direct wireless communication in accordance with an embodiment of the present disclosure.

FIG. 5A is a flowchart of a method for notifying a mobile communication device when another mobile communication device comes within range of direct wireless communication in accordance with an embodiment of the present disclosure. In step 500, a message is received from a first mobile communication device containing geographic location information. For example, proximity services server 300 receives a message from UE A 102a containing information regarding its geographic location. In step 502, the message and stored information are used to determine whether the first mobile communication device is in range of a second mobile communication device. For example, proximity services server 300 uses this geographic location information and information stored in database 302 to determine whether another device is close enough to UE A 102a to support direct communication 108 with UE A 102a. In step 504, the first mobile communication device is notified if it is in range of the second mobile communication device. For example, proximity services server 300 can send a message to UE A 102a when proximity services server 300 determines that UE B 102b is close enough to UE A 102a to support direct communication 108. In an embodiment, proximity services server 300 can perform the steps of FIG. 5A using, for example, an application stored in memory located within (or accessible by) proximity services server 300 that is executed using a processor located within (or accessible by) proximity services server 300.

Figure 5B:
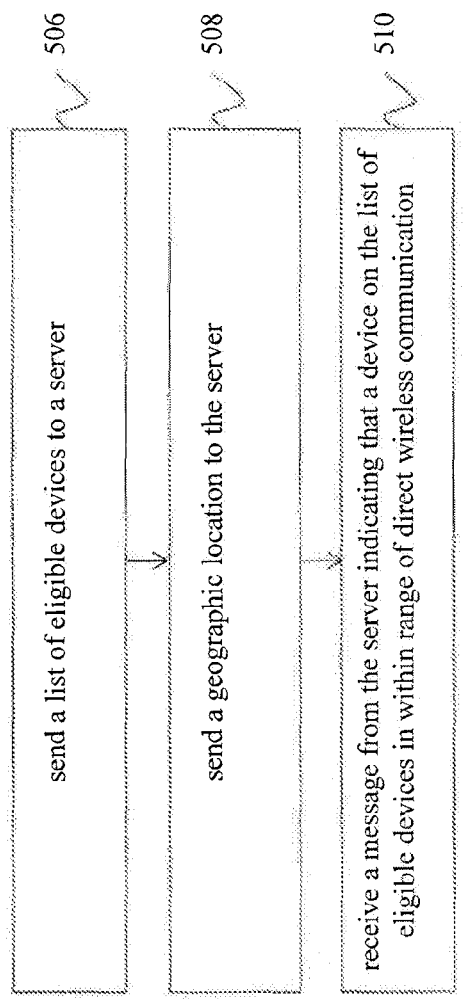
FIG. 5B is a flowchart of a method for server-assisted proximity detection in accordance with an embodiment of the present disclosure.

FIG. 5B is a flowchart of a method for server-assisted proximity detection in accordance with an embodiment of the present disclosure. In step 506, a list of eligible devices is sent to a server. For example, UE A 102a can send a friends list, containing UE B 102b, to proximity services server 300. In step 508, a geographic location is sent to the server. For example, UE A 102a can send its current geographic location to proximity services server 300. In step 510, a message is received from the server indicating that a device on the list of eligible devices in within range of direct wireless communication. For example, UE A 102a can receive a message from proximity services server 300 indicating that UE B 102b is within range of direct wireless communication 108. In an embodiment, UE A 102a can perform the steps of FIG. 5B using, for example, an application stored in memory 204a that is executed using processor 202a.

6. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented in hardware, software, or some combination thereof. For instance, signal processing functions can be implemented using computer processors, computer logic, application specific circuits (ASIC), and digital signal processors, among others, as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A mobile communication device, comprising:
a processor configured to:
send a first message including a geographic location of the mobile communication device to a server, and
receive, in response to the first message, a second message from the server indicating that a second mobile communication device is within a predetermined range of the mobile communication device; and
a wireless local area network (WLAN) module configured to:
establish a direct wireless communication link with the second mobile communication device in response to the second message,
wherein the processor is further configured to:
encapsulate a first packet containing a first Internet Protocol (IP) address used for indirect communication over a network with the second mobile communication device into a second packet containing a second IP address used for direct communication over the direct wireless communication link with the second mobile communication device, to form an encapsulated packet, wherein the second IP address used for direct wireless communication over the direct wireless communication link is generated by the processor; and
transmit the encapsulated packet, via the direct wireless communication link, to the second mobile communication device.

2. The mobile communication device of claim 1, further comprising:
a memory configured to store a peer-to-peer (P2P) application, wherein the P2P application is configured to send information to the second mobile communication device over the direct wireless communication link.

3. The mobile communication device of claim 1, wherein the processor is further configured to:
send a list of devices to the server, wherein the list of devices comprises the second mobile communication device.

4. The mobile communication device of claim 1, wherein the processor is further configured to:
receive a second encapsulated packet having a third IP address used for direct wireless communication over the direct wireless communication link;
decapsulate the second encapsulated packet to remove the third IP address to generate a fourth packet having a fourth IP address used for indirect communication over the network; and
transmit the fourth packet via the network.

5. The mobile communication device of claim 1, wherein the processor is further configured to:
update, based on the second message, an application indicating which mobile communication devices are within the predetermined range of the geographic location.

6. The mobile communication device of claim 1, further comprising:
a modem configured to initiate indirect communication, over a network, with the second mobile communication device.

7. The mobile communication device of claim 6, wherein the processor is further configured to:
monitor a signal performance metric associated with the direct wireless communication link; and
initiate the indirect communication with the second mobile communication device in response to the signal performance metric falling below a predetermined threshold.

8. The mobile communication device of claim 6, wherein the processor is further configured to:
receive a third message from the server indicating that the second mobile communication device is no longer within the predetermined range of the geographic location; and
initiate the indirect communication with the second mobile communication device in response to the third message.

9. The mobile communication device of claim 1, wherein the server is a proximity services server remote from the mobile communication device and the second mobile communication device.

10. A method, comprising:
sending, using a processing device of a first mobile communication device, a first message including a geographic location of the first mobile communication device to a server;
receiving, using the processing device, in response to the first message, a second message from the server indicating that a second mobile communication device is within a predetermined range of the first mobile communication device;
establishing, using the processing device, a direct wireless communication link with the second mobile communication device in response to the second message;
encapsulating, using the processing device, a first packet containing a first Internet Protocol (IP) address used for indirect communication over a network with the second mobile communication device into a second packet containing a second IP address used for direct communication over the direct wireless communication link with the second mobile communication device, to form an encapsulated packet, wherein the second IP address used for direct wireless communication over the direct wireless communication link is generated by the processing device; and
transmitting the encapsulated packet, via the direct wireless communication link, to the second mobile communication device.

11. The method of claim 10, further comprising:
sending, using a peer-to-peer (P2P) application, information over the direct wireless communication link to the second mobile communication device.

12. The method of claim 10, further comprising:
sending a list of devices to the server, wherein the list of devices comprises the second mobile communication device.

13. The method of claim 10, further comprising:
receiving a second encapsulated packet having a third IP address used for direct wireless communication over the direct wireless communication link;
decapsulating the second encapsulated packet to remove the third IP address to generate a fourth packet having a fourth IP address used for indirect communication over the network; and
transmitting the fourth packet via the network.

14. The method of claim 10, further comprising:
monitoring a signal performance metric associated with the direct wireless communication link; and establishing indirect communication, over a network, with the second mobile communication device in response to the signal performance metric falling below a predetermined threshold.

\* \* \* \* \*